United States Patent [19]

Morisaki

[11] 3,997,099

[45] Dec. 14, 1976

[54] METHOD OF PRODUCING COMPOSITE MATERIAL FOR BEARINGS OR SLIDING MEMBERS

[75] Inventor: Nobukazu Morisaki, Aichi, Japan

[73] Assignee: Daido Metal Company, Ltd., Nagoya, Japan

[22] Filed: Feb. 4, 1975

[21] Appl. No.: 546,994

[30] Foreign Application Priority Data

Oct. 4, 1974    Japan ............................ 49-114420

[52] U.S. Cl. ............................ 228/117; 228/208;
 228/235; 228/231; 29/149.5 S
[51] Int. Cl.² ............................................ B23K 21/00
[58] Field of Search .......... 228/117, 231, 235, 243,
228/208, 209; 29/149.5 S, 196.3, 196.6

[56] References Cited
UNITED STATES PATENTS

| | | | |
|---|---|---|---|
| 1,939,467 | 12/1933 | Short et al. ................... | 228/208 X |
| 2,605,149 | 7/1952 | Schaefer et al. .............. | 29/196.3 X |
| 2,809,422 | 10/1957 | Schultz ......................... | 228/243 X |
| 3,276,103 | 10/1966 | Kope et al. .................... | 29/149.5 S |
| 3,381,364 | 5/1968 | Winter .......................... | 228/263 X |
| 3,406,445 | 10/1968 | Kopke et al. .................. | 228/263 X |
| 3,470,607 | 10/1969 | Rader et al. ................... | 228/117 |

*Primary Examiner*—Harold D. Whitehead
*Assistant Examiner*—K. J. Ramsey
*Attorney, Agent, or Firm*—Karl W. Flocks

[57] ABSTRACT

A method of producing composite material for bearings or sliding members, comprising applying pressure, by rolling, simultaneously to a strip having a steel backing and a layer of copper-base alloy bonded to the steel backing, and a strip of lead-base alloy with the copper-base alloy layer positioned between said steel backing and said lead-base alloy strip, said pressure being such as to bond the two strips to each other to form the composite material.

14 Claims, 7 Drawing Figures

METHOD OF PRODUCING COMPOSITE MATERIAL FOR BEARINGS OR SLIDING MEMBERS

The present invention relates to a method of producing composite material for bearings or sliding members, more particularly to a method of producing composite material for bearings or sliding members comprising a steel or copper-electroplated steel backing having bonded to a face thereof a layer of copper-base alloy such as copper-lead alloy or lead-bronze alloy for bearings, and a layer of lead base alloy pressure-bonded to the copper-base alloy layer to form a bearing surface.

Heretofore, in most cases casting or electroplating has been used when forming a bearing surface layer on the face of a composite bearing material strip. In accordance with the prior art, a bearing surface layer is formed by casting a lead-base white metal bearing alloy such as the alloys with the SAE 13 through 16 (for example, the alloys with the JIS WJ 6 through 10) on the copper-base alloy layer of a bimetal strip comprising a steel backing and the copper-base alloy layer bonded to the surface of said steel backing. The prior art also includes a technique in which the above bimetal strip is formed into a desired shape, and then a lead-base alloy for forming a bearing surface layer (having such compositions as 10 % Sn and the balance Pb, or 8 % Sn, 2 % Cu, and the balance Pb) is electroplated on the face of the bimetal strip so that a bearing surface layer is provided.

When the casting technique is employed, due to the bonding operation performed at a temperature higher than the melting point of the lead alloy, brittle intermetallic compounds tend to develop between the copper-base alloy layer and the lead-alloy surface layer, resulting in a decreased bonding strength under dynamic conditions. Furthermore, since the cast alloy product does not have a uniform thickness, a facing step must be provided before the press-forming step. This is undesirable from a standpoint of the economy of operation. In addition, only a very low yield of the alloys can be obtained in this castig process. On the other hand, when the electroplating method is employed, it is needed to carry out the electroplating operation after the workpieces have been formed into respective desired shapes, with the result that the productivity is lowered, and there must be used a complicated and expensive electroplating plant. Moreover, the electrolyte is very difficult to control. If the control is done inaccurately, the constituents not desired are electrodeposited on the workpiece. It is extremely difficult to obtain at all times an electrodeposit with a desired and unvarying composition. Inaccurate control of the electrolyte also leads to a hard problem of the peeling off of electrodeposit. Further, it goes without saying that the use of electrolyte involves a pollution problem. The electroplating method has such various disadvantages as described above.

SUMMARY OF THE INVENTION

The object of the present invention is to provide a method of producing a composite material for bearings or sliding members, which is free from the disadvantages described in the foregoing.

This object has been attained by a method of producing composite material for bearings or sliding members, including applying pressure, by rolling, simultaneously to a strip having a steel backing and a layer of copper-base alloy bonded to the face of said steel backing, and a strip of lead-base alloy with said copper-base alloy layer positioned between said steel backing and said lead-base alloy strip so that said two strips have the temperature of the room temperature to 200° C, said pressure being such as to reduce the total thickness of said two strips by 8 to 40 % and being such as to bond said two strips to each other to form the composite material.

Hereunder an explanation will be given to embodiments of the present invention.

Figure 1:
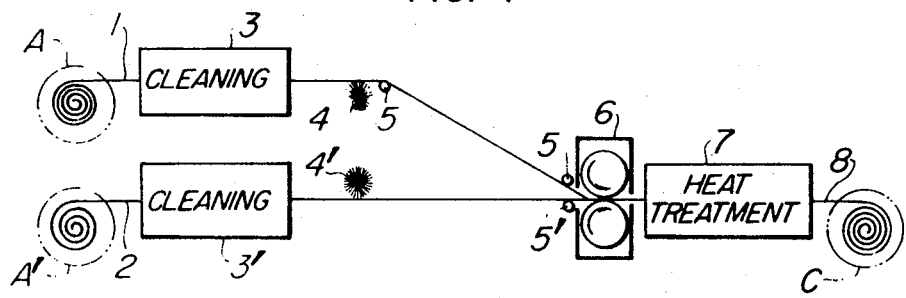
FIG. 1 is an explanatory view showing an embodiment of the method in accordance with the present invention, in which there is illustrated diagrammatically a plant to be operated for practicing the embodiment.

FIG. 1 is a schematic flow chart of an embodiment of the present invention in which there is shown diagrammatically a manufacturing plant to be operated for the purpose of practicing the embodiment. An uncoiler (supply source) A has coiled thereon a Pb-base alloy strip 1 to be worked into a bearing or a bearing surface layer. The alloy of which the strip 1 is made has a composition of at least one additive selected from a group consisting of Sn, Sb, Cu, Zn, Te, In, As, Tl, and the like, which amounts to not more than 40 % of the total volume, and the balance of Pb. From the experimental results it is known that, roughly speaking, the alloy strip 1 must have a Vickers hardness number of 11 or more, as will be explained in detail later. The alloy strip 1 should be annealed if its Vickers hardness number is less than this value.

An uncoiler A' has coiled thereon a strip 2 of a so-called bimetal comprising a steel backing or a copper-electroplated steel backing, and a copper-base bearing-alloy layer bonded to said steel backing or copper-electroplated steel backing. The copper-base alloy layer of the bimetal strip 2 may be constructed of any desired one of copper-base alloys for bearings including copper-lead alloys for bearings (for instance, the alloys with the JIS KJ 1 through 4) and lead-bronze alloys for bearings (for example, the alloys with the JIS LBC 1 through 6).

These known alloys include the following:

TABLE A

List of relevant Bearing Alloys
Copper-Lead Alloy Castings, JIS H 5403

| Class | | Symbol | Chemical Compositions % | | | | | | Hardness Hv | Applications or use |
|---|---|---|---|---|---|---|---|---|---|---|
| | | | Pb | Ni or Ag | Fe | Sn | Other | Cu | | |
| copper-lead alloy castings for bearings | class 1 | KJ 1 | 38–42 | less than 2 | less than 0.08 | less than 1 | less than 1 | Bal. | less than 30 | mostly for bearings under heavy load at high speed of rotation. |
| | class 2 | KJ 2 | 33–37 | less than 2 | less than 0.08 | less than 1 | less than 1 | Bal. | less than 35 | |
| | class 3 | KJ 3 | 28–32 | less than 2 | less than 0.08 | less than 1 | less than 1 | Bal. | less than 40 | As load is increased, castings with lower content of Pb shall be applied. |
| | class 4 | KJ 4 | 23–27 | less than 2 | less than 0.08 | less than 1 | less than 1 | Bal. | less than 45 | |

TABLE B

Lead Bronze Castings for Bearings (JIS H 5115-1958)

| Class | | Alloying Elements % | | | | Impurities | | | | Brinnel hardness HB |
|---|---|---|---|---|---|---|---|---|---|---|
| | | Cu | Sn | Pb | Zn | Ni | Zn | Fe | other | |
| JIS - LBC | 1 | Bal. | 3.0–5.0 | 3.0–5.0 | less than 4.0 | less than 1.0 | — | less than 0.3 | less than 1.0 | more than 72 |
| JIS - LBC | 2 | Bal. | 9.0–11.0 | 4.0–6.0 | — | less than 1.0 | less than 1.0 | less than 0.3 | less than 1.0 | more than 68 |
| JIS - LBC | 3 | Bal. | 9.0–11.0 | 9.0–11.0 | — | less than 1.0 | less than 1.0 | less than 0.3 | less than 1.0 | more than 64 |
| JIS - LBC | 4 | Bal. | 7.0–9.0 | 14.0–16.0 | — | less than 1.0 | less than 1.0 | less than 0.3 | less than 1.0 | more than 60 |
| JIS - LBC | 5 | Bal. | 6.0–8.0 | 16.0–22.0 | — | less than 1.0 | less than 1.0 | less than 0.5 | less than 1.0 | more than 55 |
| JIS - LBC | 6 | Bal. | 3.0–6.0 | 22.0–26.0 | — | less than 1.0 | less than 1.0 | less than 0.5 | less than 1.0 | more than 50 |

The alloy strip 1 and the bimetal strip 2 are uncoiled from the uncoilers A and A', and passed through degreasing tanks 3 and 3' containing a Trichlene vapor, for cleaning the faces thereof. Then, the bonding faces of the alloy strip 1 and the bimetal strip 2 are brushed by wire brushes 4 and 4', so that the bonding faces have a surface roughness in the range of several to several ten microns and the bonding is facilitated. The two strips at room temperature are delivered through guide rolls 5 and 5' into the nip of the rolls in a rolling mill 6. In this rolling and pressure bonding operation, the temperature of the rolls in the rolling mill and the temperature of the strips are controlled such that the face temperature of the bonded strips measured immediately after the pressure-bonding step is kept in the range from room temperature to 200° C. For example, it has been ascertained as the result of the experiment carried out by us that, when the rolling reduction produced in the steel backing is 20% at a room temperature of about 20° C (in spring, for example), the surface temperature of the rolled trimetal is about 150° C. The two strips have a room temperature before being delivered to the nip of the rolls of the rolling mill 6 for pressure bonding. However, the temperature of the trimetal may vary slightly depending on the screw down rate of the rolls and the room temperature. If the screw down rate increases and the temperature of the trimetal exceeds 200° C, the temperature is controlled so that it can be reduced to a level of 200° C or less by conventional cooling means provided with the rolls. If this face temperature exceeds 200° C, the alloy strip 1 will adhere to the rolls in the rolling mill 6, or it will be difficult to maintain proper dimensional values of the strip resulting in a degraded working property. Depending upon a particular requirement, the pressure-bonding operation may be performed in a non-oxidizing atmosphere or a reducing atmosphere. When pressure-bonding the strips, the amounts of thickness reduction of the steel backing and the alloy layers must be controlled so as to be within the following ranges:

Bimetal strip: steel backing 3 – 25 %
and
copper-base alloy layer 0.5 – 20 %
Alloy strip: lead-base alloy layer 25 – 90 %

The three-layer material pressure-bonded under the conditions described above, is sent to a heat-treatment furnace 7 where the bonding is strengthened, and after the heat treatment poorly bonded portions (blisters) are detected. The three-layer bearing material 8 pressure-bonded in the described manner is then wound on a coiler C.

Figure 2A:
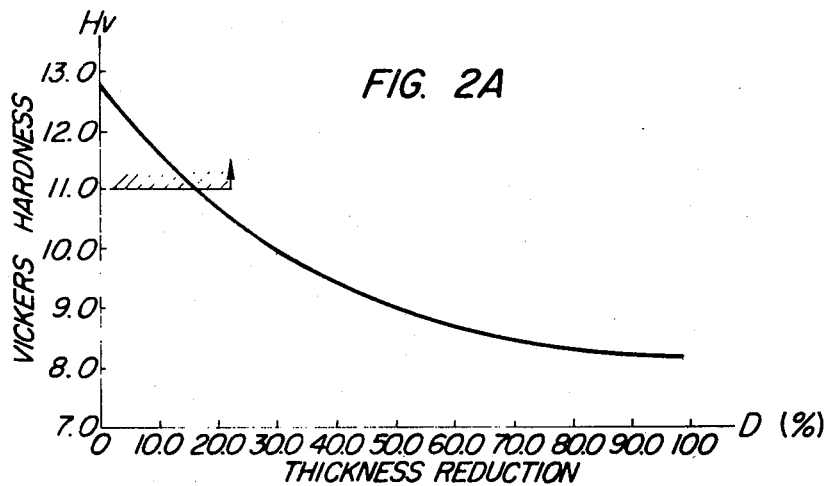
FIGS. 2A and 2B are diagrams showing the properties of an alloy strip pressure-bonded, FIG. 2A giving the relationship between the amount of thickness reduction and the hardness, and FIG. 2B giving the relationship between the annealing temperature and the hardness.
Figure 2B:
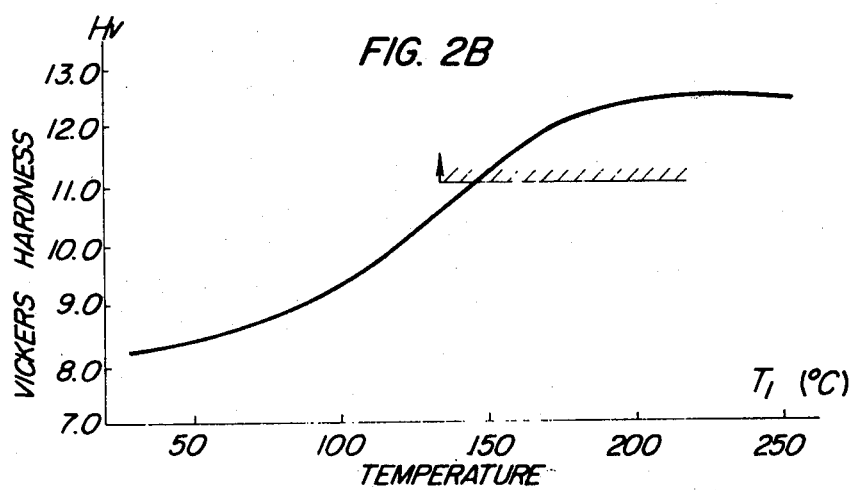

FIGS. 2A and 2B show the properties of an alloy strip to be pressure-bonded which has a composition of 10 % Sn and the balance Pb. FIG. 2A is a graph illustrating the relationship between the Vickers hardness Hv and the amount of thickness reduction, i.e., the amount of deformation D. It will be seen that the hardness Hv decreases with the increase of the amount of thickness reduction D. FIG. 2B is a graph showing the relationship between the Vickers hardness Hv and the annealing temperature T1. It will be understood that the hardness Hv increases with the increasing annealing temperature T1. As is clear from the figures, the aforesaid alloy strip has a property to soften when worked (refer to FIG. 2A) and a property to harden when annealed (refer to FIG. 2B). For this reason, in order to obtain a bearing material 8 pressure-bonded which is free from defects, it is necessary that the aforesaid alloy strip has a Vickers hardness number of 11 or more.

In FIGS. 2A and 2B, the shaded portions indicate the regions including the Vickers hardness numbers of 11 or more. If the alloy strip has a Vickers hardness number of less than 11, the alloy strip undergoes an extraordinary elongation resulting in the formation of pressed-out ends and defects in the central part. Therefore, depending on the dimensional conditions of the alloy strip, i.e., the thickness and the length, the pressure-bonding operation should be preceded by an annealing operation carried out at a required temperature.

Figure 3:
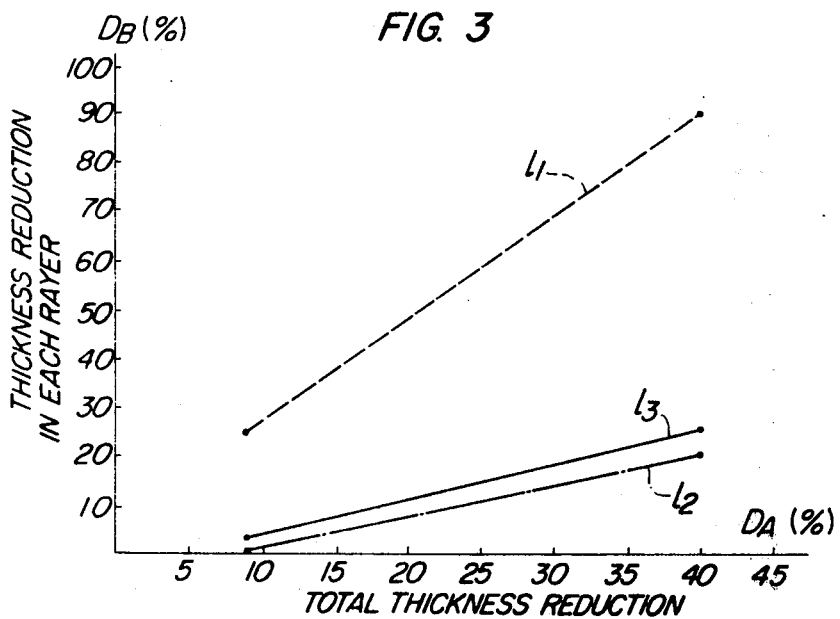
FIG. 3 is a diagram in which there are illustrated the amounts of thickness reduction of a steel backing and alloy layers which correspond to various total amounts of thickness reduction and which were measured in a series of pressure-bonding operations.

FIG. 3 illustrates the amounts of thickness reduction of the steel backing and the alloy layers, which were measured in a series of cold pressure-bonding operations. $D_A$ designates the total amounts of thickness reduction expressed in per cent, while $D_B$ indicates the amounts of thickness reduction of the steel backing and the alloy layers expressed in per cent.

Figure 4:
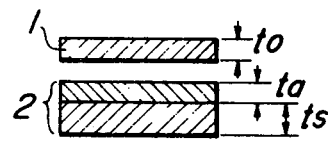
FIG. 4 is a view showing the sections of an alloy strip and a bimetal strip which are not pressure-bonded.

FIG. 4 is a sectional view showing the alloy strip 1 and the bimetal strip 2 which are not pressure-bonded. The symbols $t_s$, $t_a$, and $t_o$ respectively designate the thickness of the steel backing, the thickness of the copper-base alloy layer, and the thickness of the lead-base alloy layer. Needless to say, the total thickness before the pressure-bonding operation is expressed by the following formula:

$$t = t_o + t_a + t_s$$

Figure 5:
FIG. 5 is a sectional view illustrating a three-layer material which has been formed by pressure bonding.

FIG. 5 is a sectional view illustrating an alloy strip 1' and a bimetal strip 2' which have been pressure-bonded. The thickness of a steel backing is designated by $t_{s'}$, the thickness of a copper-base alloy layer by $t_{a'}$, and the thickness of a lead-base alloy layer by $t_{o'}$. Therefore, the total thickness after the pressure-bonding operation is as follows:

$$t' = t_{o'} + t_{a'} + t_{s'}$$

Turning again to FIG. 3, it is seen that, if a given value (%) of the total amount of thickness reduction $D_A$ is used, the amount of thickness reduction of the lead-base alloy layer attains a value $l_1$ (%), the amount of thickness reduction of the copper-base alloy layer a value $l_2$ (%), and the amount of thickness reduction of the steel backing a value $l_3$ (%). Thus, for a total amount of thickness reduction expressed by the following formula, $$D_A = (1 - t'/t) \times 100 \ (\%)$$

the amounts of thickness reduction of the lead-base alloy layer, the copper-base alloy layer, and the steel backing are respectively given by the following formulas:

$$l_1 = (1 - t_{o'}/t_o) \times 100 \ (\%)$$

$$l_2 = (1 - t_{a'}/t_a) \times 100 \ (\%)$$

$$l_3 = (1 - t_{s'}/t_s) \times 100 \ (\%)$$

As can be readily understood from FIG. 3, it is possible to manufacture a three-layer material with required dimensions by suitably selecting the dimensional values of the alloy layers and the steel backing.

As has been explained above, it has been proved that the three-layer material produced by using the 3 – 25 % thickness for the steel backing, the 0.5 – 20 % thickness reduction for the copper-base alloy layer, and the 25 – 90 % thickness reduction for the lead-base alloy layer, enjoys a very high degree of bonding, and will be further improved in its quality if such pre-treatments as degreasing, cleaning, wire brushing, and the like are performed with sufficient care.

Figure 6:
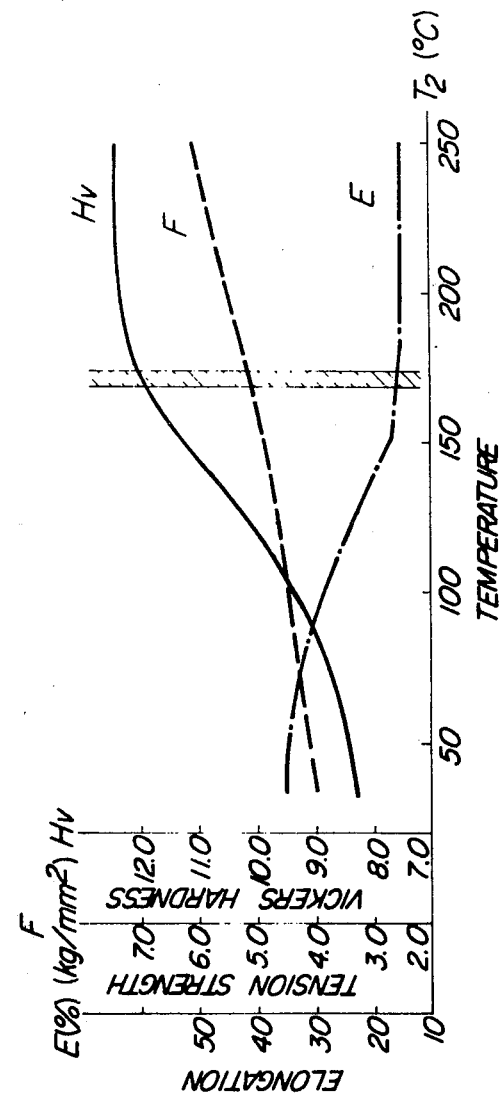
FIG. 6 is a diagram showing the changes in mechanical properties of the three-layer material, which took place in response to the changes in the heat-treatment conditions.

FIG. 6 shows mechanical properties of the three-layer material manufactured in the manner described above. In the figure there are plotted the measured values indicating mechanical properties obtained with the use of various heat-treatment conditions for a rolled Pb-base alloy strip having a thickness the same as the thickness $t_{o'}$ of the pressure-bonded alloy layer illustrated in FIG. 5. $T_2$ indicates the heat-treatment temperatures in °C ($\times$ 60 min.), and $H_v$, F, and E respectively designate the Vickers hardnesses, the tensile strengths (kg/mm²), and the elongations (%).

In the previously described embodiment where the Pb — Sn alloy was used, with a view to removing warps, detecting poorly bonded portions, increasing the bonding strength, and so on, strips were heat-treated at 170° C for 1 hour, with due consideration being given to the measured values indicating mechanical properties shown in FIG. 6. As a result, there was obtained a satisfactory three-layer bearing material.

The above explanations apply to the embodiments in which the material to be pressure-bonded is in the form of a continuous web. In the case of a small-quantity production of large-thickness bearings, needless to say, a sheet cut from the continuous web may be used in the pressure-bonding operation.

The bearing material manufactured in the manner described above by the method according to the present invention, has properties superior to those of a bearing material manufactured by electroplating the same Pb — Sn alloy as the alloy employed in the present invention.

Table 1 below gives a comparison between the mechanical properties of the product obtained by the method according to the present invention and the mechanical properties of a conventional product.

Table 1

| Mechanical properties | Alloy making up the bearing layer | Product of the present invention (pressure bonding) | Conventional product (electroplating) |
| --- | --- | --- | --- |
|  |  | 10 % Sn - bal. Pb | 10 % Sn - bal. Pb |
| Vickers hardness (Hv) |  | 11 – 12 | 7 – 8 |
| Tensile strength (kg/mm²) |  | 4.5 – 5.5 | 2.5 – 3 |

Table 1-continued

|  | Alloy making up the bearing layer | Product of the present invention (pressure bonding) | Conventional product (electroplating) |
|---|---|---|---|
| Mechanical properties |  | 10 % Sn - bal. Pb | 10 % Sn - bal. Pb |
| Elongation (%) |  | 15 – 25 | 10 – 25 |

A comparison between the pressure-bonded product of the present invention using the 10 % Sn — balance Pb alloy and the conventional electroplated product using the 10 % Sn — balance Pb alloy, reveals that the former product has higher hardness and tensile strength than the latter product, and they have the nearly the same elongations. Besides this comparison, comparisons were made under identical alloy composition conditions between the pressure-bonded products of the present invention having various alloy compositions, conventional electroplated products for bearing surface layers having various alloy compositions, and conventional Pb-base white-metal cast products for bearing surface layers having various alloy compositions. The test results showed that these three products have mechanical properties and properties as a bearing which are almost the same as the mechanical properties listed in Table 1.

An explanation will be given hereunder to the reasons for numerical limitations used in the method according to the present invention.

1. The pressure-bonding temperature in the range from room temperature to 200° C:

As described previously, the upper limit of 200° C was set in order to avoid a likelihood that the alloy strip will adhere to the rolls in the rolling mill, or that the control of strip dimensions will be rendered difficult.

2. The total amount of thickness reduction during a pressure-bonding operation in the range from 8 to 40 %:

The lower limit was set at 8 % on the basis of the fact that achieving a complete bonding requires a minimum value of 8 % for the total amount of thickness reduction $D_A$. The steel backing of the material for bearings preferably have, as a mechanical property thereof, a Vickers hardness number of 200 or less. For this reason, the total amount of thickness reduction attaining this hardness ($D_A$ 40 %) was chosen as the upper limit.

The foregoing explanations apply to a three-layer material. The method according to the present invention is also applicable to cases where the steel backing of the bimetal strip is electroplated by copper and/or a layer of metal or alloy other than Cu is bonded between the steel backing and the alloy layer of the bimetal strip and/or the lead-base alloy layer has bonded to a face thereof Sn or Sn - alloy layer.

The method according to the present invention enjoys distinct advantages over the conventional casting and electroplating methods as follows:

I. A better productivity (working property) is obtained.
II. A continuous production is possible.
III. There is attained a wider range of application. It is unnecessary to employ complicated steps such as the electroplating of an alloy layer and the facing after casting. The method according to the present invention is applicable to any Pb - base alloy capable of making up an alloy strip.
IV. Dimensional control in the direction of thickness is performed very readily. A composite material with required dimensions can be manufactured by selecting the conditions for thickness reduction including the setting of the rolls in the rolling mill depending upon the properties of the alloy strip to be used.
V. The method according to the present invention involves no problem of environmental pollution. The method does not accompany such problems as the discharge water incidental to the electroplating method and the air pollution due to the casting method.
VI. Production can be carried out at a low cost. As described previously, the method according to the present invention allows a continuous production, which naturally results in a marked saving in cost. Furthermore, the method according to the present invention eliminates the material costs and the electric charges needed in the electroplating method, and the various expenses and the cost of a cutting step for the cast Pb - base alloy layer needed in the casting method.

What we claim is:

1. A method of producing composite material for bearings or sliding members, including
    applying pressure, by rolling, simultaneously to a strip having a steel backing and a layer of copper-base alloy bonded to the face of said steel backing, and a strip of lead-base alloy with said copper-base alloy layer positioned between said steel backing and said lead-base alloy strip.
    said two strips having a temperature in the range between the room temperature and 200° C when said two strips are rolled and bonded to each other by pressure bonding, the temperature of said two strips being controlled by the rolls of the rolling mill which is equiped with cooling means,
    said pressure being such as to reduce the total thickness of said two strips by 8 to 40% and being such as to bond said two strips to each other to form the composite material.

2. A method as claimed in claim 1, wherein said lead-base alloy includes, in addition to lead, 40 % by volume of at least one additive selected from a group consisting of Sn, Sb, Cu, Zn, Te, In, As and Tl.

3. A method as claimed in claim 2, wherein said copper-base alloy is a copper-lead bearing alloy selected from the group consisting of JIS KJ 1 through 4 alloys or a lead-bronze bearing alloy selected from the group consisting of JIS LBC 1 through 6 alloys.

4. A method as claimed in claim 3, wherein said steel backing is electroplated with copper.

5. A method as claimed in claim 4, wherein said lead base alloy strip has bonded to a face thereof a layer of tin or tin alloy.

6. A method as claimed in claim 1, wherein said pressure is such as to reduce the thickness of the steel backing by 3 to 35 %, the thickness of the copper-base alloy layer by 0.5 to 20 % and the thickness of the lead-base alloy strip by 25 to 90 %.

7. A method as claimed in claim 1, wherein said copper-base alloy is a copper-lead bearing alloy selected from the group consisting of JIS KJ 1 through 4 alloys or a lead-bronze bearing alloy selected from the group consisting of JIS LBC 1 through 6 alloys.

8. A method as claimed in claim 1, wherein said steel backing is electroplated with copper.

9. A method as claimed in claim 1, wherein said lead base alloy strip has bonded to a face thereof a layer of tin or tin alloy.

10. A method of producing composite material for bearings or sliding members, comprising
   cleaning a face of a strip having a steel backing and a layer of copper-base alloy bonded to the face of the steel backing,
   cleaning a face of a strip of lead-base alloy,
   applying pressure, by rolling, simultaneously to the two strips with said copper-base alloy layer positioned between said steel backing and said lead-base alloy strip so that the two strips during said rolling have a temperature in the range of room temperature to 200° C, said pressure being such as to reduce the total thickness of the two strips by 8 to 40% and being such as to bond the two strips to each other to form the composite material, and
   heat treating the composite material.

11. A method as claimed in claim 10, wherein said cleaning of the faces of the respective strips is effected by degreasing and scratch brushing to provide on said faces several to several tens microns of surface roughness.

12. A method as claimed in claim 10, wherein said heat treating is effected in a reducing atmosphere.

13. A method as claimed in claim 10, wherein said heating is effected in non-oxidizing atmosphere.

14. A method as claimed in claim 10, wherein said pressure being such as to reduce the thickness of the steel backing by 3 to 35 %, the thickness of the copper-base alloy layer by 0.5 to 20 % and the thickness of the lead-base alloy strip by 25 to 90 %.

* * * * *